(12) United States Patent
Pora et al.

(10) Patent No.: US 11,365,692 B2
(45) Date of Patent: Jun. 21, 2022

(54) FUEL METERING CIRCUIT AND METHOD WITH COMPENSATION FOR FUEL-DENSITY VARIABILITY

(71) Applicant: SAFRAN AIRCRAFT ENGINES, Paris (FR)

(72) Inventors: Loic Pora, Moissy-Cramayel (FR); Arnaud Bernard Clement Thomas Joudareff, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 211 days.

(21) Appl. No.: 16/630,705

(22) PCT Filed: Jul. 13, 2018

(86) PCT No.: PCT/FR2018/051778
§ 371 (c)(1),
(2) Date: Jan. 13, 2020

(87) PCT Pub. No.: WO2019/012238
PCT Pub. Date: Jan. 17, 2019

(65) Prior Publication Data
US 2021/0087980 A1    Mar. 25, 2021

(30) Foreign Application Priority Data

Jul. 13, 2017 (FR) .................................. 17 56706

(51) Int. Cl.
*F02C 9/26* (2006.01)
*F02C 7/232* (2006.01)

(52) U.S. Cl.
CPC .............. *F02C 9/263* (2013.01); *F02C 7/232* (2013.01); *F05D 2220/323* (2013.01); *F05D 2240/35* (2013.01); *F05D 2260/60* (2013.01)

(58) Field of Classification Search
CPC .... F02C 9/263; F02C 9/32; F02C 9/36; F02C 9/38; F02C 9/28; F02C 7/232
See application file for complete search history.

(56) References Cited

U.S. PATENT DOCUMENTS 2,809,492 A * 10/1957 Arkawy .................... F02C 9/28
                                                                60/39.281
4,809,499 A    3/1989 Dyer
(Continued)

FOREIGN PATENT DOCUMENTS

FR    3 022 000 A1    12/2015

OTHER PUBLICATIONS

International Search Report dated Nov. 23, 2018 in PCT/FR2018/051778 filed on Jul. 13, 2018, 2 pages.
(Continued)

*Primary Examiner* — Andrew H Nguyen
(74) *Attorney, Agent, or Firm* — Oblon, McClelland, Maier & Neustadt, L.L.P.

(57) ABSTRACT

A fuel metering circuit for a turbomachine includes: a meter; a pump; a control valve configured to return an excess flow of fuel delivered to the meter towards the pump on the basis of a fuel pressure differential at the terminals of the meter; a diaphragm; and a volumetric flow meter. The diaphragm and the volumetric flow meter are mounted parallel to the meter, downstream of the control valve, in order to determine a density of the fuel flowing in the metering circuit.

9 Claims, 3 Drawing Sheets

(56) References Cited

U.S. PATENT DOCUMENTS

| | | | | |
|---|---|---|---|---|
| 2003/0192300 A1* | 10/2003 | Mahoney | ............... | F02C 9/263 60/734 |
| 2009/0301575 A1* | 12/2009 | Arnett | ..................... | F02C 7/232 137/468 |
| 2012/0167594 A1* | 7/2012 | Poisson | ..................... | F02C 9/36 60/803 |
| 2016/0123860 A1 | 5/2016 | McBrien et al. | | |
| 2017/0101935 A1 | 4/2017 | Waissi et al. | | |

OTHER PUBLICATIONS

French Search Report dated Jul. 13, 2017, in Patent Application No. 1756706, 4 pages (with English Translation of Category of Cited Documents).

International Search Report and Written Opinion dated Nov. 23, 2018, in PCT/FR2018/051778, 9 pages.

\* cited by examiner

FUEL METERING CIRCUIT AND METHOD WITH COMPENSATION FOR FUEL-DENSITY VARIABILITY

FIELD OF THE INVENTION

The invention relates to a fuel metering circuit for a turbomachine, and to a metering method that can be implemented by such a circuit.

TECHNOLOGICAL BACKGROUND

A turbomachine conventionally comprises a fuel metering circuit comprising a fuel metering device, delivering to the combustion chamber of the turbomachine a fuel flow rate adapted to the operating rpm of the turbomachine.

The metering circuit also comprises (for the case of turbojet engines equipping the aircrafts with fuel tanks integrated thereinto—vs the aircraft architectures equipped with turbomachines other than the turbojet engines and having an integrated tank) a pump which takes the fuel from the fuel tank of the turbomachine, to convey it to the metering device, as well as a regulating valve which allows recirculating toward the pump an excess fuel flow rate provided to the metering device.

Each operating rpm of the turbomachine imposes a corresponding fuel mass flow rate which must be delivered by the metering device. FIG. 1 represents the density of different types of fuels (each curve numbered 1 to 4 corresponding to a different fuel, the curve numbered 5 corresponds to one example of sizing of the engine) as a function of the temperature. It appears in this figure that the density of a fuel can vary significantly, in particular as a function of the type of fuel used (more or less volatile fuels) and of the fuel temperature. Currently, the metering devices are controlled from control laws which link a desired target mass flow rate to a position of the metering device, for defined conditions of temperature and of fuel type.

Consequently, these control laws do not allow taking into account the variability of the fuel density in the control of the metering device and therefore accurately adapting the metered mass flow rate to the density of the fuel to obtain the target mass flow rate.

In addition, it is not possible to accurately know the mass flow rate delivered by the metering device because the flow meters used to know the amount of fuel delivered by the metering device are volume flow meters, the mass flow meters not having sufficient reactivity to provide reliable information adapted at any time to the engine rpm of the turbomachine.

This results in a significant inaccuracy, in the order of 12%, on the mass flow rate delivered by the metering device to the fuel combustion chamber.

It is possible to calculate the proportion of inaccuracy in the flow rate delivered by the metering device, which results from the ignorance of the fuel density by the following formula (A) expressing the delivered flow rate:

$$Wf = K \cdot S \cdot \sqrt{\rho \cdot \Delta P} \quad \text{(A)}$$

With:
Wf the mass flow rate injected by the metering device in kg/h
$\rho$ the fuel density in kg/L
K a constant, and
S the opening section of a slot of the metering device in mm$^2$ The impact of the density on the injected flow rate is as follows:

$$\frac{dWf}{Wf} = -\frac{1}{2} \cdot \left(\frac{d\rho}{\rho}\right)$$

A density varying from 700 to 900 kg/m$^3$ creates an inaccuracy on the injected mass flow rate comprised between −6.4 and 6.1%, compared to a law calculated with an average density of 803 kg/m$^3$.

However, this inaccuracy affects the sizing of the turbomachine.

Particularly, a significant change in the rpm of the turbomachine, for example from a high speed range to an idle rpm or vice versa, causes an abrupt variation in the flow rate delivered to the combustion chamber. This variation occurs in less time than the variation of the rotational speed of the turbomachine. Operating tolerances, called surge and shutdown margins, must therefore be defined so that the turbomachine continues to operate despite a delivered flow rate different from the appropriate need necessary for the operation and adapted to its current rotational speed, these tolerances being achieved by an oversizing of the turbomachine.

Due to the large inaccuracy on the flow rate delivered by the metering device, the tolerances as well as the oversizing of the turbomachine must be even greater.

Some solutions have been proposed, comprising the use of a temperature sensor, combined with a calculator correcting the control of the metering device according to laws of compensation established based on the density or on the temperature of the fuel.

However, this solution allows correcting only part of the temperature-related deviations, by further adding other sources of uncertainty related to the drafting of the law.

SUMMARY OF THE INVENTION

The invention aims at overcoming the drawbacks of the prior art by proposing a fuel metering system having increased accuracy on the metered flow rate compared to the prior art.

To this end, the invention proposes a fuel metering circuit for a turbomachine comprising:
  a metering device,
  a pump configured to circulate a fuel flow rate toward the metering device,
  a regulating valve configured to return an excess fuel flow rate delivered to the metering device toward the pump according to a difference in fuel pressure at the terminals of the metering device,
  a diaphragm, and
  a volume flow meter configured to determine the volume flow rate of the fuel passing through the diaphragm.

The diaphragm and the volume flow meter are mounted in parallel with the metering device in a bypass duct, downstream of the regulating valve, in order to determine a density of the fuel circulating in the metering circuit.

Some preferred but non-limiting characteristics of the metering circuit described above are the following, taken individually or in combination:
  the volume flow meter is mounted upstream or downstream of the diaphragm.
  the metering circuit further comprises an electronic card configured to receive information from the volume flow meter on the volume flow rate of the fuel and adjust a metering device monitoring setpoint by taking into account the fuel density thus determined.

the pump comprises a volumetric pump.

According to a second aspect, the invention also proposes a turbomachine comprising such a metering circuit.

According to a third aspect, the invention proposes a fuel metering method implemented in a fuel metering circuit, characterized in that it comprises the following steps:

determining a pressure difference at the terminals of the metering device, measuring a volume flow rate of the fuel by using the volume flow meter, calculating, from the pressure difference, from the volume flow rate and from constants related to the diaphragm, the fuel density.

Some preferred but non-limiting characteristics of the metering method described above are the following, taken individually or in combination:

the method further comprises a step during which the flow meter transmits information on the volume flow rate of the fuel to an electronic card and the electronic card adjusts a metering device monitoring setpoint by taking into account the fuel density.

the fuel flow rate is monitored by recirculating a variable fuel flow rate toward the pump by means of the regulating valve.

BRIEF DESCRIPTION OF THE DRAWINGS

Other characteristics, aims and advantages of the present invention will become apparent upon reading the following detailed description, and in relation to the appended drawings given by way of non-limiting examples and in which.

DETAILED DESCRIPTION OF ONE EMBODIMENT

Figure 1:
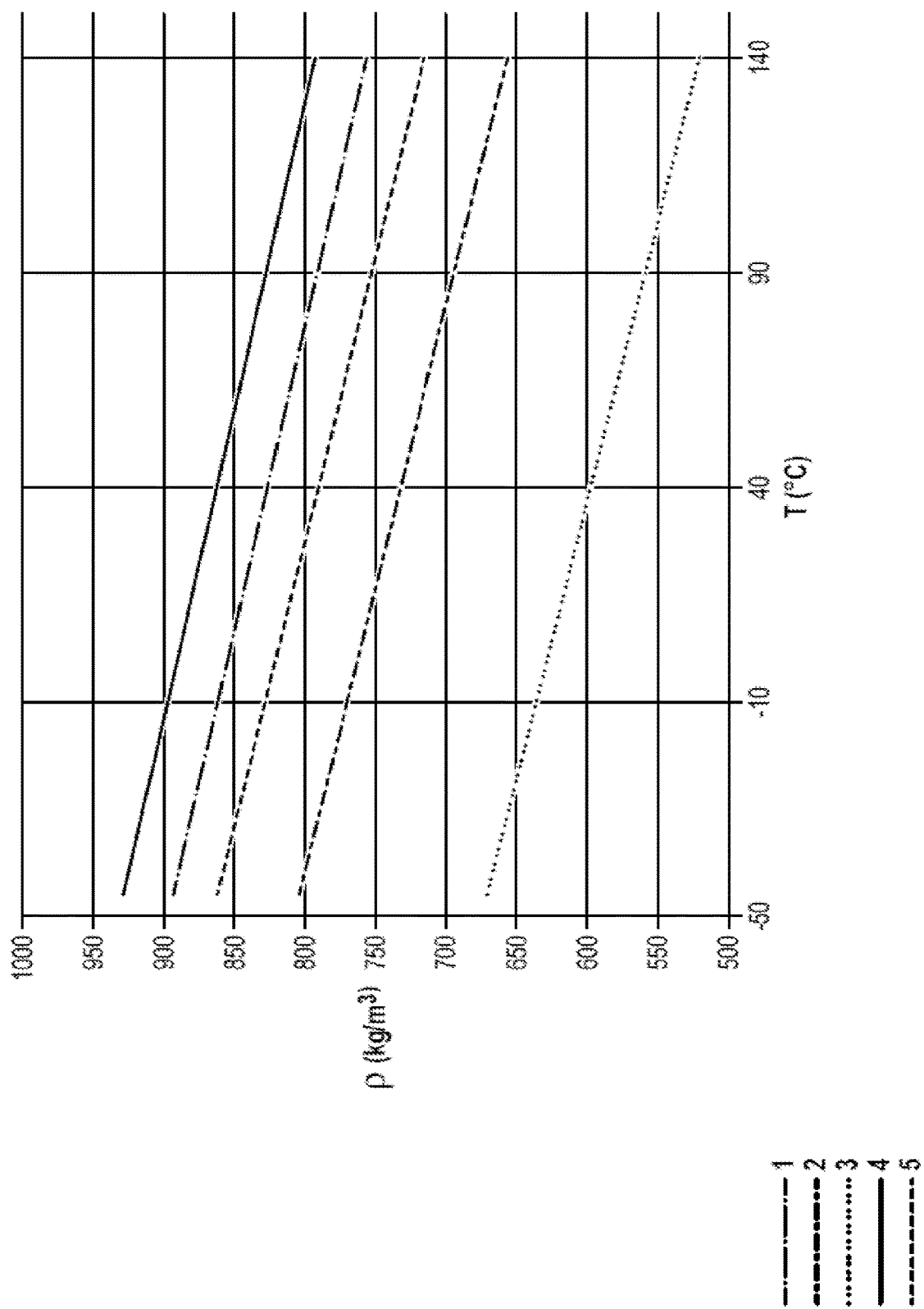
FIG. 1, already described, represents the variation in density of several fuels as a function of temperature.
Figure 2:
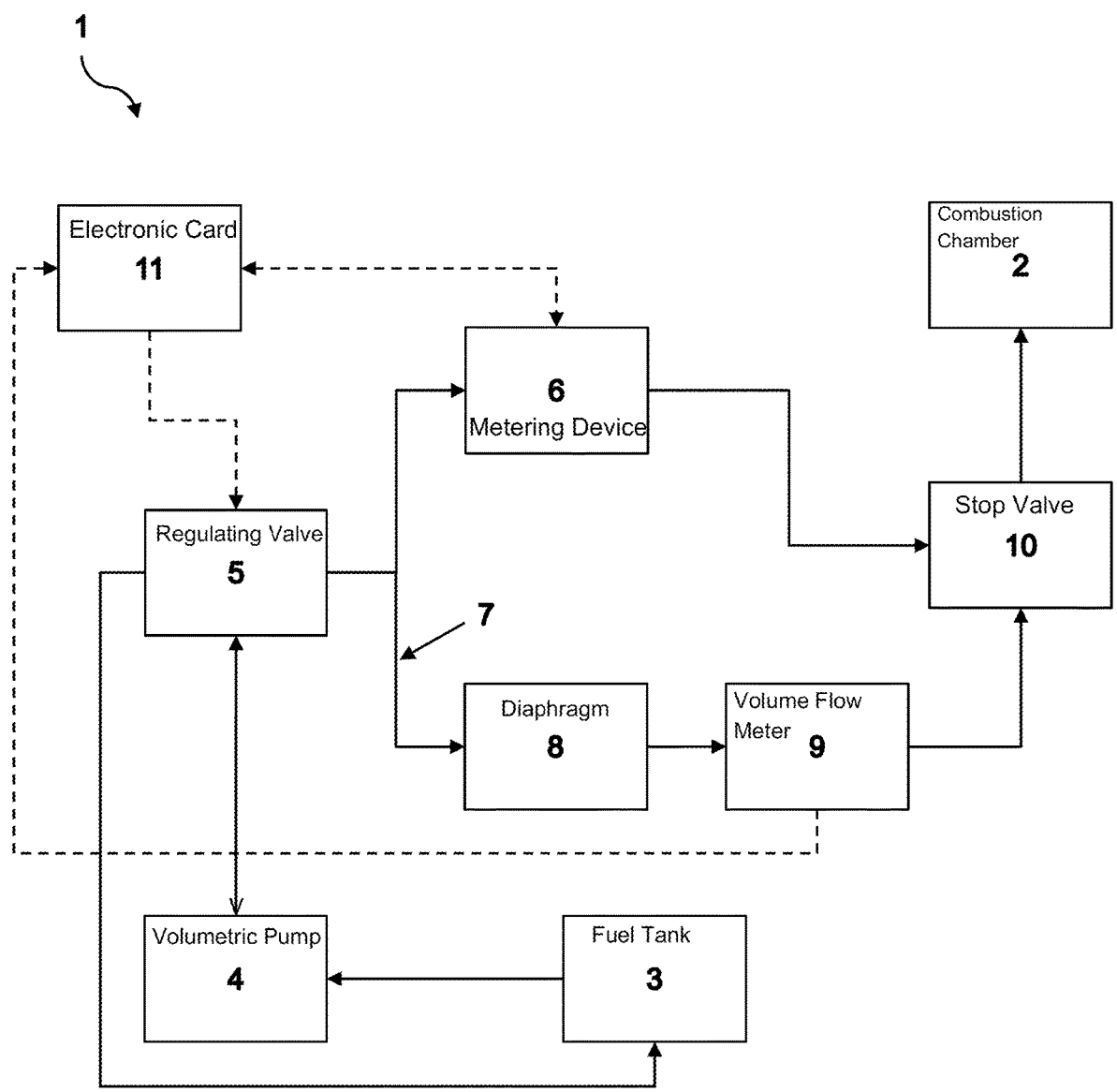
FIG. 2 schematically represents a metering circuit according to one embodiment of the invention.
Figure 3:
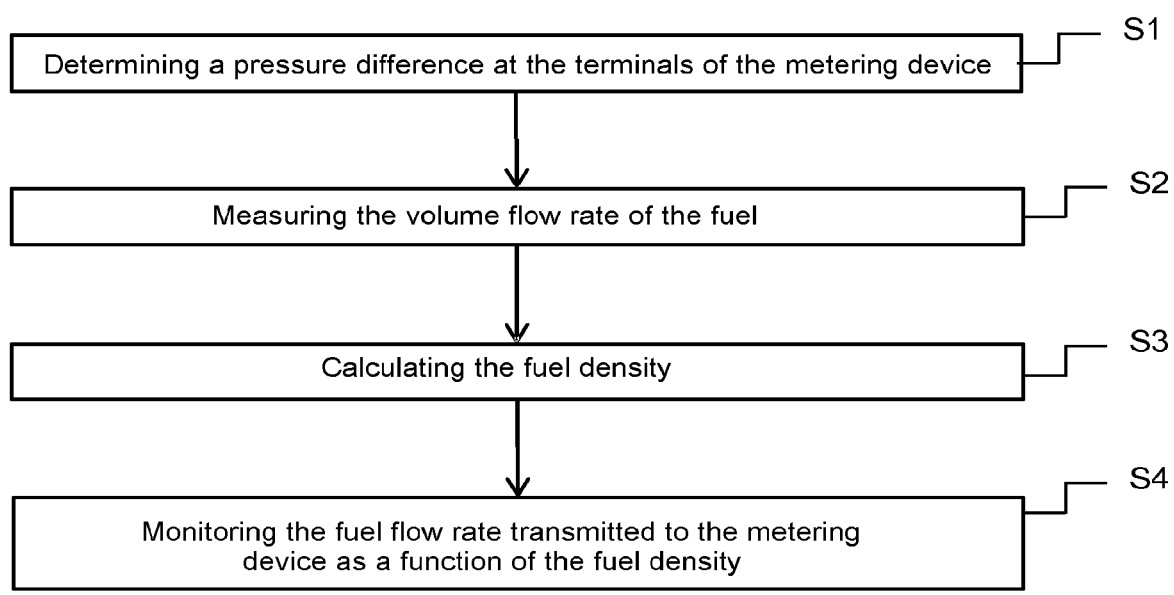
FIG. 3 is a flowchart illustrating steps of one exemplary embodiment of a metering method according to the invention.

FIG. 2 represents a fuel metering circuit 1 for a turbomachine, including at least one combustion chamber 2 and one fuel tank 3.

The fuel metering circuit 1 includes a volumetric pump 4, a metering device 6 and a metering device supply line called high-pressure supply line, connecting the outlet of the volumetric pump 4 to the inlet of the metering device 6. The metering device 6 is adapted to deliver a target mass flow rate to the combustion chamber 2 from an initial flow rate which is delivered thereto by the volumetric pump 4 via the high-pressure line.

The metering device 6 comprises a surface, called metering device opening surface, of variable size, which allows the flow of the liquid. The flow rate delivered by the metering device 6 is therefore in particular a function of the opening surface.

The metering device 6 opening surface is variable on the driving of a servovalve, which controls the movement of a movable metering part to gradually obstruct a metering orifice or slot. A position sensor allows knowing the position of the movable part. The position sensor is typically an LDVT (linear variable differential transformer) sensor.

There are different types of metering devices 6, for example with a conventional metering slot, described in document U.S. Pat. No. 7,526,911, or with an exponential slot, described in documents EP 1 231 368 and FR 2 825 120. In the case of an exponential slot, the opening surface exponentially increases with the movement of the movable part, which allows better accuracy at low flow rate.

The metering circuit can further comprise a stop valve 10 or HPSOV (High Pressure Shut-off Valve) configured to authorize or block a fuel injection into the combustion chamber.

Optionally, the metering circuit 1 can comprise an electronic card 11 to monitor the metering of the fuel. To do so, the electronic card can, for example, communicate with the metering device 6 in both directions: it can send position setpoints to the metering device 6 and recover data on the metering device.

The electronic card 11 can also be connected to a monitoring unit, external to the device. The monitoring unit is typically an electronic regulation module ECU (engine control unit) of a FADEC (Full Authority Digital Engine Control) that is to say of a full authority digital regulation system which monitors the variable geometries (actuators, metering devices, etc.) of the aircraft. The monitoring unit can be located within the aircraft perimeter and therefore cannot be dedicated solely to the regulation of the fuel. Conversely, the electronic card 11 is preferably exclusively dedicated to the metering of the fuel and to the auxiliary functions. As a variant, it is also possible to have an additional monitoring device, in addition to the main monitoring device that can be in particular exclusively reserved for the metering. The connection between the monitoring unit and the electronic card 11 is generally made with a connection harness.

Only the electronic card 11 of the metering circuit 1 is connected to the aircraft monitoring unit (by means of a single harness), the redistribution then being carried out within the metering circuit 1 by the electronic card 11. The metering circuit 1 therefore comprises a single inlet from the monitoring unit to the electronic card 11, which divides this inlet into several outlets, namely in particular the metering device 6.

The fuel metering circuit 1 further includes a regulating valve 5, adapted to regulate the flow rate delivered to the metering device 6. Particularly, the regulating valve 5 is adapted to return an excess fuel flow rate at the inlet of the volumetric pump 4, as a function of the pressure difference at the terminals of the metering device 6. The regulating valve 5 is also used to maintain the fuel pressure differential $\Delta P$ constant between the upstream and the downstream of the metering device 6.

Typically, the regulating valve 5 comprises a movable shutter acting against the action of a loaded spring on a predetermined value of the pressure differential $\Delta P$ to be maintained. The shutter is generally perforated so as to discharge fuel on a pipe leading to the recirculation loop, according to its position of equilibrium against the action of the spring.

One example of a regulation valve 5 which can be used here has been described in document FR 1655944, filed on Jun. 27, 2016 by the Applicant.

In order to allow accurate setting for the small openings, the metering circuit 1 further comprises a bypass duct 7 placed in parallel with the metering device 6 and comprising a minimum flow rate diaphragm 8 and a volume flow meter 9.

The diaphragm 8 has a fixed section $S_d$ set during preliminary tests carried out on a bench. Typically, the diaphragm may comprise an orifice of fixed dimension and shape.

At the terminals of the diaphragm 8 is applied a pressure difference which, as seen above, is regulated and defined by the regulating valve 5. This pressure difference $\Delta P$ is equal to the pressure difference $\Delta P$ at the terminals of the metering device 6, since the diaphragm is mounted in parallel with the metering device 6 in the bypass circuit 7.

The pressure difference $\Delta P$ can in particular be measured by a differential sensor.

Furthermore, the head loss due to the passage through the diaphragm 8 is determined by the following formula (B):

$$\Delta P = \frac{1}{2}\rho Q^2 \frac{\xi}{S_d^2} \quad (B)$$

Where
$\rho$ is the density of the fuel,
$\xi$ is the head loss coefficient of the diaphragm 8, which is a constant,
Q is the volume flow rate passing through the diaphragm 8 of section $S_d$.

However, the pressure upstream and downstream of the diaphragm 8 is known and defined by the regulating valve 5. It can also be measured using the differential sensor. The section of the diaphragm 8 is determined beforehand by tests carried out on a bench. The volume flow rate is measured using the volume flow meter 9 which is placed in series with the diaphragm 8 (upstream or downstream of the diaphragm 8, in the bypass duct 7). Finally, the head loss coefficient of the diaphragm 8 is a constant: therefore, the ratio $$\frac{\xi}{S_d^2}$$

is also constant.

It is deduced that, within the measurement errors, according to the formula (B), the volume flow rate Q varies exclusively as a function of the fuel density.

The diaphragm 8 and the volume flow meter 9 placed in series in the bypass duct therefore form an in-line density meter that allows improving the overall accuracy of the metering circuit 1.

Where appropriate, when the metering circuit 1 comprises an electronic card 11, the measurements made by the flow meter 9 are communicated to the electronic card 11 so that the latter deduces the fuel density therefrom. The electronic card 11 can then adjust the metering device 6 monitoring setpoint by taking into account the volume density of the fuel.

As a variant, in the absence of electronic card 11 in the metering circuit 1, the measurements made by the flow meter 9 are communicated directly to the metering device 6 control unit.

In order to estimate the metering accuracy obtained thanks to the diaphragm 8 and to the addition of the flow meter 9, it is necessary to take into account the calibration accuracy obtained beforehand during tests carried out on a test bench and the measurement inaccuracies in normal operation.

The accuracy of a volume flow meter 9 is in the order of +/−0.8% of the measurement. Depending on the measured flow rate, this possible deviation takes into account the entire temperature range. However, in the opposite case, it is possible to measure the temperature in the bypass duct 7 comprising the diaphragm 8 and the flow meter 9 and to apply a patch on the read flow rate, the turbine flow meters being sensitive to the viscosity of the fluid.

In addition, during the preliminary tests carried out on a bench, the electronics are calibrated more finely than on-board electronics. The uncertainty for the characterization (usually of +/−0.5% of the measurement) is therefore lower.

In what follows, from a conservative point of view, identical measurement accuracy in calibration and in operation across all temperatures of +/−0.8% of the measurement will be considered.

Likewise, a differential pressure sensor has an accuracy of +/−0.8% of the full scale.

For the balance sheet, a scale of 5 bars, i.e. accuracy in the order of +/−1% for a measurement of 4 bars (conventional value of regulated pressure difference) will be considered.

Considering the following formula, defining the injected volume flow rate:

$$Q = A \cdot S \cdot \sqrt{\frac{\Delta P}{\rho}}$$

where:
Q is the flow rate measured in L/h using the volume flow meter 9
$\rho$ is the fuel density in kg/L
S is the fuel passage section, linked to the opening of the metering device 6
A is the opening of the metering slot of the metering device 6 in mm the impact of the pressure and of the volume flow rate on the measurement of the fuel density $\rho$ is determined:

$$Q = A \times S \times \sqrt{\frac{\Delta P}{\rho}}$$

Namely:

$$\rho = A \times S \times \frac{\Delta P}{Q^2}$$

and $$\frac{d\rho}{\rho} = 2 \times \frac{dQ}{Q} + \frac{d\Delta P}{\Delta P}$$

All these measurement errors are random. Thus, the error on the density $\varepsilon_\rho$ will be equal to:

$$\varepsilon_\rho = \sqrt{(\varepsilon_{\Delta P_{calibration}} \varepsilon_{\Delta P}) + 2 \times (\varepsilon_{Q_{calibration}} + \varepsilon_Q)}$$

$$\varepsilon_\rho = \pm\sqrt{1+1+2\times(0.8+0.8)} = \pm 2.3\%$$

The error on the flow rate corrected by the density $$\frac{dQ}{Q} = 0.5 \times \frac{d\rho}{\rho}$$

obtained through the diaphragm 8 and the volume flow meter 9 will therefore be $$\frac{2.3\%}{2} = \pm 1.15\%.$$

The error on the flow rate corrected by the pressure difference will be $$\frac{0.8\%}{2} = \pm 0.4\%.$$

It is noted that in the absence of regulation, the density variation causes a variation in flow rate from −6.4% to +6.1% while with the regulation, the flow rate variation will be comprised in a range of about +/−1.6%, particularly when the metering circuit 1 comprises an electronic card 11. In the absence of the electronic card 11, the flow rate variation can be comprised between −3% and +3%.

The fuel metering using such a fuel metering circuit 1 then comprises the following steps:
- determining S1 a pressure difference at the terminals of the metering device 6,
- measuring S2 a fuel volume flow rate using the volume flow meter 9,
- calculating S3, from the pressure difference, from the volume flow rate and from constants related to the diaphragm 8, the fuel density,
- determining information on the volume flow rate of the fuel and transmitting S4 this information to the electronic card 11 so that the electronic card 11 adjusts a metering device 6 monitoring setpoint by taking into account the fuel density.

It should be noted that the fuel flow rate is monitored S4 by recirculating a variable fuel flow rate toward the pump 4 by means of the regulating valve 5.

The invention claimed is:

1. A fuel metering circuit for a turbomachine comprising:
   a metering device;
   a pump configured to circulate a fuel flow rate toward the metering device;
   a regulating valve configured to regulate the fuel flow rate delivered to the metering device according to a difference in fuel pressure at terminals of the metering device;
   a diaphragm; and
   a volume flow meter configured to determine a volume flow rate of fuel passing through the diaphragm,
   wherein the diaphragm and the volume flow meter are mounted in parallel with the metering device in a bypass duct, downstream of the regulating valve, in order to determine a density of the fuel circulating in the metering circuit.

2. The metering circuit according to claim 1, wherein the volume flow meter is mounted upstream or downstream of the diaphragm.

3. The metering circuit according to claim 1, further comprising an electronic card configured to receive information from the volume flow meter on the volume flow rate of the fuel and adjust a metering device monitoring setpoint by taking into account the fuel density thus determined.

4. The metering circuit according to claim 1, wherein the pump comprises a volumetric pump.

5. A turbomachine comprising a fuel metering circuit according to claim 1.

6. An aircraft comprising the turbomachine of claim 5.

7. A fuel metering method implemented in a fuel metering circuit according to claim 1, the method comprising:
   determining the difference in fuel pressure at the terminals of the metering device;
   measuring the volume flow rate of the fuel using the volume flow meter; and
   calculating, from the difference in fuel pressure, from the volume flow rate and from constants related to the diaphragm, the fuel density.

8. The metering method according to claim 7, further comprising a step during which the flow meter transmits information on the volume flow rate of the fuel to an electronic card and the electronic card adjusts a metering device monitoring setpoint by taking into account the fuel density.

9. The metering method according to claim 7, wherein the fuel flow rate is monitored by recirculating a variable fuel flow rate toward the pump by the regulating valve.

* * * * *